US011441007B2

(12) United States Patent
Mortara et al.

(10) Patent No.: US 11,441,007 B2
(45) Date of Patent: Sep. 13, 2022

(54) FLUOROPOLYMER COMPOSITION FOR MULTILAYER ASSEMBLIES

(75) Inventors: Stefano Mortara, Arconate (IT); Julio A. Abusleme, Saronno (IT)

(73) Assignee: SOLVAY SPECIALTY POLYMERS ITALY S.P.A., Bollate (IT)

(*) Notice: Subject to any disclaimer, the term of this patent is extended or adjusted under 35 U.S.C. 154(b) by 0 days.

(21) Appl. No.: 14/131,747

(22) PCT Filed: Jul. 10, 2012

(86) PCT No.: PCT/EP2012/063487
§ 371 (c)(1),
(2), (4) Date: Jan. 9, 2014

(87) PCT Pub. No.: WO2013/010854
PCT Pub. Date: Jan. 24, 2013

(65) Prior Publication Data
US 2014/0127434 A1 May 8, 2014

(30) Foreign Application Priority Data
Jul. 15, 2011 (EP) ........................ 1174085

(51) Int. Cl.
*C08K 3/22* (2006.01)
*C08F 214/22* (2006.01)
(Continued)

(52) U.S. Cl.
CPC ............... *C08K 3/22* (2013.01); *B29C 48/21* (2019.02); *B32B 27/304* (2013.01); *B32B 27/36* (2013.01);
(Continued)

(58) Field of Classification Search
CPC ......... Y10T 428/1352; Y10T 428/1393; Y10T 428/31515; Y10T 428/49826;
(Continued)

(56) References Cited

U.S. PATENT DOCUMENTS 3,318,850 A * 5/1967 Stilmar ............... C08F 214/225
526/255
3,660,537 A * 5/1972 Fryd et al. ............ C08F 265/06
525/293
(Continued)

FOREIGN PATENT DOCUMENTS

GB      2238054 A  *  5/1991  ............. B82Y 30/00
JP    05194668 A  *  8/1993
(Continued)

OTHER PUBLICATIONS

Koboproducts, Attenuation Grade TiO2 Dispersions, available online at koboproductsinc.com/downloads/kobo-tio2dispersion.pdf on Jun. 13, 2010.*
(Continued)

*Primary Examiner* — Lee E Sanderson
(74) *Attorney, Agent, or Firm* — Osha Bergman Watanabe & Burton LLP

(57) ABSTRACT

The invention pertains to a composition (C1) comprising: at least one (meth)acrylic modified VDF polymer [polymer (A)] comprising recurring units derived from comprising recurring units derived from vinylidene fluoride (VDF) monomer and at least one hydrophilic (meth)acrylic monomer (MA) of formula (I), wherein each of R1, R2, R3, equal or different from each other, is independently a hydrogen atom or a $C_1$-$C_3$ hydrocarbon group, and $R_{OH}$ is a hydrogen or a $C_1$-$C_5$ hydrocarbon moiety comprising at least one hydroxyl group; at least one inorganic UV blocker compound in an amount not exceeding 5% wt, with respect to the weight of polymer (A), to multilayer assemblies comprising one layer made from said composition (C1), to a method for manufacturing said multilayer assemblies and to the use of the same in different field of use, including protection of PV modules.

(Continued)

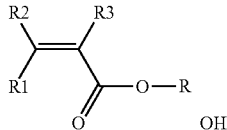

(I)

13 Claims, 2 Drawing Sheets

(51) Int. Cl.

| | | |
|---|---|---|
| *C08F 20/06* | (2006.01) | |
| *B29C 48/21* | (2019.01) | |
| *C09D 127/16* | (2006.01) | |
| *C08F 14/22* | (2006.01) | |
| *C08L 27/16* | (2006.01) | |
| *B32B 27/30* | (2006.01) | |
| *B32B 27/36* | (2006.01) | |
| *C08K 3/30* | (2006.01) | |

(52) U.S. Cl.
CPC .............. *C08F 14/22* (2013.01); *C08K 3/30* (2013.01); *C08L 27/16* (2013.01); *C09D 127/16* (2013.01); C08J 2427/16 (2013.01); C08K 2003/2296 (2013.01); Y10T 29/49826 (2015.01); Y10T 428/1352 (2015.01); Y10T 428/1393 (2015.01); Y10T 428/3154 (2015.04); Y10T 428/31515 (2015.04)

(58) Field of Classification Search
CPC .............. Y10T 29/49826; C08L 27/16; C08K 2003/0881; C08K 2003/2241; C08K 2003/2296; C08F 214/22; C08F 14/22; C09D 127/16; B32B 17/10018; C08J 2427/16
USPC ..................................... 428/34.7, 35.7, 36.91
See application file for complete search history.

(56) References Cited

U.S. PATENT DOCUMENTS

| | | | | |
|---|---|---|---|---|
| 4,031,062 A | * | 6/1977 | Shirayama | C08F 8/42 156/334 |
| 4,581,412 A | * | 4/1986 | Ohmori | C07C 17/275 525/199 |
| 5,352,725 A | * | 10/1994 | Palmer | C08K 3/22 252/507 |
| 5,504,134 A | * | 4/1996 | Palmer | C08K 3/22 252/507 |
| 6,525,144 B1 | * | 2/2003 | Tanahashi | C08F 232/08 525/332.1 |
| 2009/0155570 A1 | * | 6/2009 | Bonnet | C09D 127/16 428/327 |
| 2009/0169496 A1 | * | 7/2009 | Nasu | A61K 8/044 424/59 |
| 2009/0226742 A1 | * | 9/2009 | Blum | C09D 183/04 428/447 |
| 2010/0133482 A1 | * | 6/2010 | Abusleme | B01D 71/76 252/511 |
| 2010/0175742 A1 | * | 7/2010 | Burchill | H01L 31/049 136/251 |
| 2010/0180938 A1 | * | 7/2010 | Nagato | C08G 18/6279 136/256 |
| 2010/0221525 A1 | * | 9/2010 | Jonschker | B82Y 30/00 428/327 |
| 2011/0220184 A1 | * | 9/2011 | Aruga | B32B 7/12 136/251 |
| 2012/0240973 A1 | * | 9/2012 | Buehne | C09D 127/16 136/244 |
| 2018/0222161 A1 | * | 8/2018 | Liu | B32B 1/02 |

FOREIGN PATENT DOCUMENTS

| | | | | |
|---|---|---|---|---|
| JP | WO 2010067803 A1 | * | 6/2010 | .............. B32B 7/12 |
| WO | 2007079246 A2 | | 7/2007 | |
| WO | 2008129041 A1 | | 10/2008 | |
| WO | 2010043665 A1 | | 4/2010 | |
| WO | WO 2010043665 A1 | * | 4/2010 | .............. C08L 27/12 |

OTHER PUBLICATIONS

Xanthos, Editor:Marino. Functional Fillers for Plastics. John Wiley & Sons, 2010, p. 395 (Year: 2010).*

Cayton et al., The Impact of Nano-Materials on UV-Protective Coatings, NSTI-Nanotech, vol. 1, 2006 (Year: 2006).*

* cited by examiner

FLUOROPOLYMER COMPOSITION FOR MULTILAYER ASSEMBLIES

CROSS-REFERENCE TO RELATED APPLICATION

This application is a U.S. national stage entry under 35 U.S.C. §371 of International Application No. PCT/EP2012/063487 filed Jul. 10, 2012, which claims priority to European application No. EP11174085.8 filed on 15 Jul. 2011. The entire contents of these applications are explicitly incorporated herein by this reference.

TECHNICAL FIELD

The invention pertains to a polymer composition suitable for manufacturing multilayer structures based on a vinylidene fluoride (VDF) polymer layer and on a further layer, useful for back protection of photovoltaic (PV) modules.

BACKGROUND ART

Vinylidene fluoride (VDF) polymers have been widely used for manufacturing protective and packaging films and coatings, due to their outstanding trasparency, weatherability and mechanical properties.

It also often happens that pigments or additives or, more broadly, compounds having UV-blocking activity have been used in these films and are thus the material of choice when opacity to UV rays is required, like notably in photovoltaic modules.

Photovoltaic modules generally comprise active photovoltaic cells generally encapsulated in a clear packaging for protection, and a backsheet, having as primary function protection against water vapour, oxygen and UV radiation, necessary to protect the photocell components (including dielectric layer) from degradation induced by reaction with water, oxygen or UV radiation. While fluoropolymers have found use in this field, generally multilayer structures involving polyester layers (e.g. PET, PEN . . . ) or other layers are practiced, wherein the additional sheet provides excellent water vapour resistance at relatively lower cost, but, because of its susceptibility to degradation from exposure to environmental influences, such as UV radiation, IR radiation, and ozone, an additional fluoropolymer outer layer is added.

However these constructions can suffer from the drawback of poor adhesion of the VDF polymers to said additional layer, in particular to polyester layers; corona discharge or similar technology are thus e.g. routinely carried out on polyester film and glues are used for increase adhesion to the VDF polymers when producing laminates from pre-formed VDF polymer and additional films. Coextrusion, which is more economically effective processing technology for manufacturing multilayer backsheet over glue colamination, cannot be applied to the manufacture of standard VDF polymer/polyester assemblies.

On the other side, due to the inherent adhesive properties of VDF polymer comprising (meth)acrylic recurring units, these matter materials can provide suitable adhesion to further layers with no need neither of surface pre-treatment or of glues, so that consistent multilayer structures can be achieved directly through extrusion, possibly through the use of hot melt adhesive under the form of co-extruded tie-layers.

Nevertheless, for achieving suitable UV opacity, the (meth)acrylic modified VDF polymer is generally compounded as generally done with 'standard' PVDF materials, i.e. with high loads of white inorganic pigments, these inorganic compounds somewhat 'saturating' the functionalities provided by the (meth)acrylic monomer and finally detrimentally affecting or even inhibiting adhesion properties.

SUMMARY OF INVENTION

The Applicant has now surprisingly found that it is possible to obtain suitable UV opacity while maintaining outstanding adhesion to different substrates, even in co-extrusion, by adding to a (meth)acrylic modified VDF polymer a reduced amount (<5% wt) of a UV-blocker.

The invention thus pertains to a composition [composition (C1)] comprising:
at least one (meth)acrylic modified VDF polymer [polymer (A)] comprising recurring units derived from comprising recurring units derived from vinylidene fluoride (VDF) monomer and at least one hydrophilic (meth)acrylic monomer (MA) of formula:

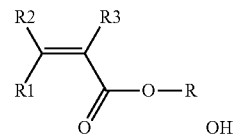

wherein each of R1, R2, R3, equal or different from each other, is independently a hydrogen atom or a $C_1$-$C_3$ hydrocarbon group, and $R_{OH}$ is a hydrogen or a $C_1$-$C_5$ hydrocarbon moiety comprising at least one hydroxyl group, [polymer (A), herein below],
at least one inorganic UV blocker compound in an amount not exceeding 5% wt, with respect to the weight of polymer (A).

The invention further pertains to a multilayer assembly comprising: (L1) a first layer [layer (L1)] made from composition (C1) as above detailed; and
(L2) a second layer [layer (L2)] made from a second composition [composition (C2)].

DETAILED DESCRIPTION

Figure 1:
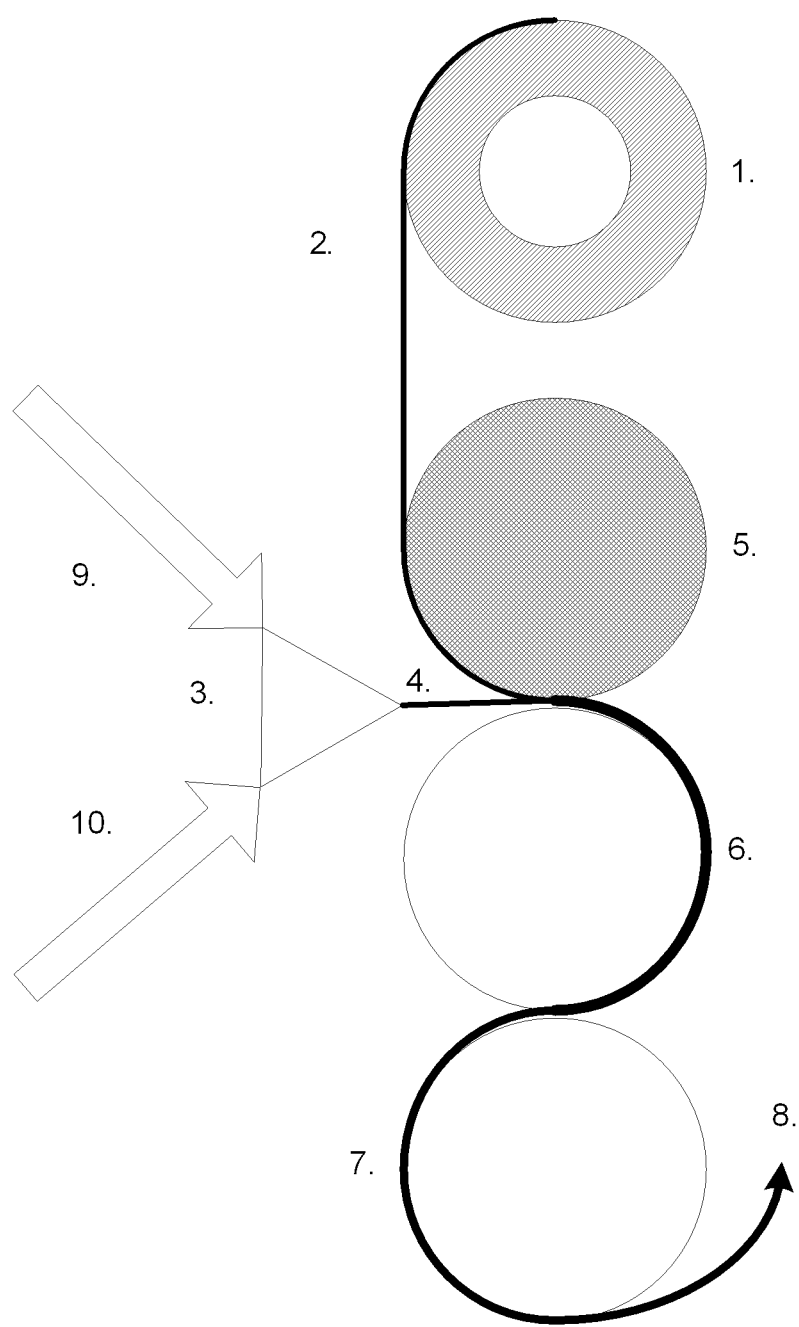
FIG. 1 is a schematic illustration of an extrusion-lamination apparatus comprising at least an unwinding station for feeding a film through a top roller and center roller, wherein a co-extruded film is fed through the center roller and a bottom roller to form a multilayer assembly which is sent to a winder.

The Applicant has found that the multilayer structure as above detailed, despite the limited amount of inorganic material used in composition (C1) maintains an outstanding UV opacity, making it suitable for being notably used as back-sheet in PV cells and ensure a perfect cohesion between the different layers.

The composition (C1), which represents one aspect of the invention, has been thus found to advantageously combine outstanding UV opacity and adhesion to polyester materials.

Composition (C1) comprises at least one polymer (A), as above detailed, comprising recurring units derived from derived from vinylidene fluoride (VDF) monomer and from at least one hydrophilic (meth)acrylic monomer (MA).

The VDF monomer referred to herein can include, in addition to vinylidene fluoride, at least one conventionally used monomer copolymerizable with vinylidene fluoride, such as vinyl fluoride, trifluoroethylene, trifluorochloroethylene, tetrafluoroethylene, hexafluoropropylene, and fluoroalkyl vinyl ether. However, it is preferred that the amount of vinylidene fluoride in the vinylidene fluoride monomer is at least 70 mol %, with respect to the total VDF monomer, so as not to impair the excellent properties of vinylidene fluoride resin, such as chemical resistance, weatherability, and heat resistance. Very preferably, the VDF monomer does not include any monomer other than vinylidene fluoride, that is to say the VDF monomer is vinylidene fluoride.

The term "at least one hydrophilic (meth)acrylic monomer (MA)" is understood to mean that the polymer (A) may comprise recurring units derived from one or more than one hydrophilic (meth)acrylic monomer (MA) as above described. In the rest of the text, the expressions "hydrophilic (meth)acrylic monomer (MA)" and "monomer (MA)" are understood, for the purposes of the present invention, both in the plural and the singular, that is to say that they denote both one or more than one hydrophilic (meth)acrylic monomer (MA).

Preferably, polymer (A) consists essentially of recurring units derived from VDF mononomer and monomer (MA).

Polymer (A) may still comprise other moieties such as defects, end-groups and the like, which do not affect nor impair its physico-chemical properties.

Non limitative examples of hydrophilic (meth)acrylic monomers (MA) are notably acrylic acid, methacrylic acid, hydroxyethyl (meth)acrylate, hydroxypropyl(meth)acrylate; hydroxyethylhexyl(meth)acrylates.

The monomer (MA) is more preferably selected among:

hydroxyethylacrylate (HEA) of formula:

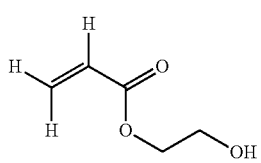

2-hydroxypropyl acrylate (HPA) of either of formulae:

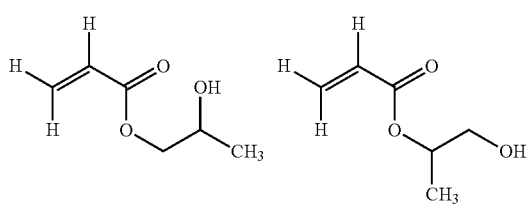

acrylic acid (AA) of formula:

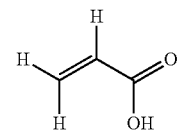

and mixtures thereof.

Most preferably, the monomer (MA) is AA and/or HEA.

Polymer (A) comprises generally at least 0.05, preferably at least 0.1, more preferably at least 0.2% moles of recurring units derived from said hydrophilic (meth)acrylic monomer (MA).

Polymer (A) comprises preferably at most 10, more preferably at most 7.5% moles, even more preferably at most 5% moles, most preferably at most 3% moles of recurring units derived from said hydrophilic (meth)acrylic monomer (MA).

Examples of commercially available polymers (A) which have been found particularly suitable for being used in the composition (C1) of the present invention are notably SOLEF® PVDF grades of 5000 or 40 000 series.

The choice of the inorganic UV blocker compound of composition (C1) is not particularly limited provided that it efficiently prevents penetration of wavelengths in the UV region, i.e. wavelengths of less than 380 nm and it remains stable at the processing conditions of polymer (A). P articles of inorganic UV blocker compound having an average particle size of less than 150 nm have been found to provide particularly good results and outstanding UV opacity. Without being bound by this theory, the Applicant believe that the small particle size and thus corresponding high surface area enables increasing interfacial interactions with polymer (A) which are particularly beneficial for achieving expected UV opacity.

Selection of particles of inorganic UV blocker compound having an average particle size of 1 to 150 nm is preferred for achieving the required UV opacity at the low concentrations at which the inorganic UV blocker compound is used in composition (C1).

In order to achieve best effectiveness in UV blocking in polymer (A) containing compositions, without detrimental effect on adhesion behaviour of polymer (A), it is generally preferred for the particles of the inorganic UV blocker to have an average particle size of at most 140 nm, preferably of at most 120 nm, more preferably of at most 100 nm, even more preferably of at most 80 nm.

Examples of heat resistant inorganic UV blocker compounds which can be used in the composition of the invention include notably compounds comprising oxides of one or more of Ce, Cu, Zn, Zr, Bi, Si, Al, Fe, Ti, Sn, and Sb.

The particles of said inorganic UV blocker compounds can additionally include other organic or inorganic compounds, typically added as surface modifiers.

Inorganic UV blocker compounds which have been found particularly useful to the purpose of the invention are those comprising $TiO_2$ and/or $ZnO$.

According to a first embodiment of the invention, the inorganic UV blocker compound comprises $TiO_2$, and possibly comprises at least one other inorganic oxide compound; particles of the inorganic UV blocker compound of this embodiment can optionally be treated with at least one organic dispersing agent.

Among preferred inorganic UV blocker compound particles of this embodiment, mention can be made of particles comprising:

a core consisting essentially of $TiO_2$; and a shell consisting essentially of at least one oxide of Si, Al or mixture thereof.

While the crystalline form of $TiO_2$ is not particularly limited, it is generally understood that rutile form of $TiO_2$ will be preferred over anatase form, to the aim of depressing photocatalytic activity and decomposition phenomena deriving therefrom.

Said preferred particles may further comprises at least one other layer of a third material which can be the same of different from the materials of the core and of the shell. The particles may comprise a further coating, either completely surrounding (e.g., encapsulating) or partially covering the particle, of a suitable coating additive, such as a dispersing agent, a stabilizer, an antistatic agent and the like. Coatings of organic dispersing agents have been found particularly useful, in particular those wherein stearates (esters and salts) are used.

According to a second embodiment of the invention, the inorganic UV blocker compound comprises ZnO, and possibly comprises at least one other inorganic oxide compound; particles of the inorganic UV blocker compound of this second embodiment can optionally be treated with at least one organic dispersing agent.

As said, composition (C1) comprises the inorganic UV blocker compound in an amount not exceeding 5% wt, with respect to the weight of polymer (A).

As said, the Applicant has found that only when using particles of the inorganic UV blocker compound at concentration of 5% wt or less, as above detailed, it is advantageously possible to obtain a composition (C1) possessing outstanding UV opacity while maintaining required adhesion behaviour, in particular towards hot melt adhesive, and/or polyester-based materials.

When an amount of more than 5 wt % is used, the beneficial effect in adhesion provided by the presence on the VDF polymer by the monomer (MA), as above described, is substantially lost.

It is preferred for composition (C1) to comprise the inorganic UV blocker compound in an amount not exceeding 4% wt, more preferably not exceeding 3 wt %, with respect to the weight of polymer (A).

Composition (C1) may further comprise additional components and ingredients. According to certain embodiments, the composition (C1) might additionally comprise at least one fluorine-free (meth)acylic polymer [polymer (M)]. Polymer (M) is advantageously selected from homo- and co-polymers of alkyl (meth)acrylate, in particular from homo- and co-polymers of methylmethacrylate. In case polymer (M) is present in composition (C1), the weight ratio between the polymer (A) and the polymer (M) is generally comprised from 60/40 to 95/5; best results are generally obtained when this ratio is about 80/20.

Nevertheless, compositions (C1) wherein essential components are the polymer (A) and the inorganic UV blocker compound as above detailed are preferred.

As said, a multilayer assembly comprising:

(L1) a first layer [layer (L1)] made from a composition (C1) as above detailed; and (L2) a second layer [layer (L2)] made from a second composition [composition (C2)] is another object of the present invention.

Thickness of layer (L1) is not particularly limited; it is nevertheless understood that layer (L1) will possess a thickness of at least 10 µm, preferably of at least 15 µm, more preferably of at least 20 µm. Layers (L1) having thickness of less than 10 µm, while still suitable for the multilayer assembly of the invention, will not be used when adequate mechanical resistance is required.

As per the upper limit of thickness of layer (L1), this is not particularly limited, provided that said layer (L1) still can provide the flexibility and lightweight required for the particular field of use targeted.

In particular for use of the multilayer assembly for protection of PV cell modules, layers (L1) having a thickness of at most 250 µm, preferably of at most 200 µm, even more preferably 150 µm will be advantageously used.

Generally, composition (C2) comprises advantageously at least one polymeric component different from polymer (A) as above detailed.

Composition (C2) comprises advantageously at least one component selected from the group consisting of a polyolefin [polymer (O)] and a polyester [polymer (P)].

According to a first embodiment, composition (C2) comprises at least one polyolefin [polymer (O)]; the expression polyolefin polymer is used according to its current meaning, i.e. to refer to materials comprising recurring units derived from alpha-olefins.

Preferably the polymer (O) is selected among polymers comprising recurring units derived from ethylene and/or from propylene. Particularly preferred are ethylene polymers layers.

According to a second embodiment, composition (C2) comprises at least one polyester [polymer (P)]; the expression polyester polymer is used according to its current meaning, i.e. to refer to materials comprising an ester functional group in the main chain.

Non limitative examples of polyesters are notably:

polyglycolide, polyglycolic acid (PGA) and copolymers thereof, generally obtained from polycondensation of glycolic acid, possibly in admixture with other polycondensable comonomer(s);

polylactic acid (PLA) and copolymers thereof, generally obtained from ring-opening polymerization of lactide, possibly in admixture with other polycondensable comonomer(s);

polycaprolactone (PCL) and copolymers thereof, generally obtained from ring-opening polymerization of caprolactone, possibly in admixture with other polycondensable comonomer(s);

polyethyleneadipate (PEA) and other copolymers;

polyhydroxyalkanoate (PHA), generally obtained from bacterial fermentation of sugars or lipids, which are the result of polycondensation of hydroxy fatty acids with chain lengths from 3 to 15 carbon atoms;

polyethylene terephthalate (PET) and copolymers thereof, generally obtained from polycondensation of terephthalic acid and ethylene glycol, possibly in admixture with other polycondensable comonomer(s);

polybutylene terephthalate (PBT) and copolymers thereof, generally obtained from polycondensation of terephthalic acid with 2,3-butandiol, possibly in admixture with other polycondensable comonomer(s);

polytrimethylene terephthalate (PTT) and copolymers thereof, generally obtained from polycondensation of terephthalic acid and 1,3-propanediol, possibly in admixture with other polycondensable comonomer(s);

polyethylene naphthalate (PEN) and copolymers thereof, generally obtained from polycondensation of naphthalene dicarboxylic acid and ethylene glycol, possibly in admixture with other polycondensable comonomer(s).

Among polyesters as above mentioned, polyethylene terephthalate (PET) and copolymers thereof and polyethylene naphthalate (PEN) and copolymers thereof are those generally preferred in the multilayer structures of the present invention.

According to certain embodiments, in particular in combination with polymer (P) and polymer (O), as above detailed, composition (C2) further comprises at least one pigment. According to this embodiment of the invention, the pigment used in composition (C2) is selected among inorganic oxide compounds, preferably from those comprising $TiO_2$, possibly in combination with another inorganic oxide.

Pigmented composition (C2), and more particularly compositions wherein white pigments are used, will be selected for those fields of use wherein a high reflection of visible radiation is preferred, as notably when using the multilayer assemblies as back-sheets in PV cells.

Thickness of layer (L2) is not particularly limited; it is nevertheless understood that, in particular when layer (L2) is made from a composition comprising polymer (P) and/or polymer (O), as above detailed, it will possess a thickness of at least 15 μm, preferably of at least 20 μm, more preferably of at least 25 μm. Layers (L2) having thickness of less than 15 μm, while still suitable for the multilayer assembly of the invention, will not be used when particular water vapour and oxygen barrier properties are required.

As per the upper limit of thickness of layer (L2), this is not particularly limited, provided that said layer (L2) still can provide the flexibility and lightweight required for the particular field of use targeted.

In particular for use of the multilayer assembly for protection of PV cell modules, layers (L2), in particular when made from a composition (C2) comprising polymer (O) and/or polymer (P), as above detailed, having a thickness of at most 350 μm, preferably of at most 250 μm, even more preferably of at most 200 μm will be advantageously used.

Layer (L1) and layer (L2) are generally made to adhere to each other with no need of additional adhesive layer. It may nevertheless well be for an additional layer to be present among layer (L1) and layer (L2), without this falling outside the scope of the present invention.

The multilayer assembly may thus additionally comprise a third layer (L3), said layer adhering to layer (L1) on one side and to layer (L2) on the opposite side.

Layout of the multilayer assembly of this embodiment will thus provide for a layer (L3), made from a composition (C3), comprised between layer (L2), as above detailed, and layer (L1), as above detailed.

Composition (C3) is not particularly limited, provided that it ensures adequate adhesion between layer (L1) and layer (L2) when manufacturing multilayer assemblies, e.g. via extrusion technique.

Thermoplastic hot melt adhesive are the preferred materials for composition (C3), when adhesion is to be achieved via extrusion techniques.

Composition (C3) generally comprises at least one of:

(C3-A) alpha-olefin polymers modified by grafting of at least one monomer comprising a functional group selected from the group consisting of a carboxyl acid (in its acid, ester, salt, amide, anhydride form), a hydroxyl, and an epoxide; and (C3-B) linear copolymers comprising recurring units derived from monoethylenic monomers which carry an alkyl carboxyate functional group.

The graft modified alpha-olefin polymer (C3) can be prepared from a homopolymer or from a copolymer of an alpha-olefin. Preferred examples of alpha-olefin polymers comprise polyethylene, polypropylene, an ethylene/propylene copolymer, an ethylene/1-butene copolymer, an ethylene/4-methyl-1-pentene copolymer, a propylene/1-butene copolymer, poly(1-butene) and copolymers of the above-mentioned alpha-olefins with minor amounts of diolefins or of unsaturated carboxylic acid esters, such as an ethylene/butadiene copolymer, a propylene/butadiene copolymer, an ethylene/vinyl acetate copolymer and an ethylene/ethyl acrylate copolymer.

Examples of monomers carrying a carboxyl or acid anhydride group are acrylic acid, methacrylic acid, maleic acid, fumaric acid, itaconic acid, crotonic acid, citraconic acid, maleic anhydride, itaconic anhydride, crotonic anhydride and citraconic anhydride. Acrylic acid and maleic anhydride are preferred with the aim of improving the adhesion. Maleic anhydride is very particularly preferred.

Examples of monomers carrying a hydroxyl group are 2-hydroxyethyl acrylate and methacrylate, 2-hydroxypropyl acrylate and methacrylate, 2-hydroxybutyl acrylate and methacrylate, N-(methylol)acrylamide and N(methylol) methacrylamide, 2-propyn-1-ol and hydroxy vinyl ethers.

Examples of monomers carrying an epoxide group are glycidyl acrylate, glycidyl methacrylate, glycidyl ethylacrylate, mono- and diglycidyl itaconate, mono- and diglycidyl maleate, mono- and diglycidyl allylsuccinate, allyl glycidyl ether, 2-methylallyl glycidyl ether, p-glycidylstyrene, 3,4-epoxy-1-butene, 3,4-epoxy-3-methyl-1-butene and vinylcyclohexene monoxide.

A graft modified alpha-olefin polymer which is particularly suitable for being used in the composition (C3) is polyethylene grafted with maleic anhydride.

The linear copolymers comprising recurring units derived from monoethylenic monomers which carry an alkyl carboxyate functional group (C3-B) are preferably linear copolymers comprising recurring units derived from at least one (meth)acrylic monomer.

According to a preferred embodiment of the invention, composition (C3) comprises at least one linear copolymer (C3-B) comprising recurring units derived from an alpha-olefin and recurring units derived from a (meth)acrylic monomer.

Among alpha-olefins, ethylene, propylene, 1-butene can be mentioned, with ethylene being preferred. As per the (meth)acrylic monomer, preference is given to monomers comprising, in addition to the ester moiety of the (meth) acrylic function, at least one additional functional group selected from a carboxyl acid (in its acid, ester, salt, amide, anhydride form), a hydroxyl and an epoxide.

Most preferably, composition (C3) comprise at least one linear copolymer (C3-B) comprising recurring units derived from ethylene and recurring units derived from glycidyl acrylate or glycidyl methacrylate.

Non limitative examples of commercially available polymers suitable for being used in composition (C3) of the present invention are notably E-GMA copolymers sold under trade name IGETABOND® E from Sumitomo or as LOTADER® AX8804 from Arkema.

Further in addition, composition (C3) can comprise additional polymer components different from components (C3-A) and (C3-B), as above detailed, like notably variable amounts of polymer (A) and/or of polymer (P), as above described, as well as additional polymer components, including fluoropolymers, and more specifically vinylidene fluoride polymers different from polymer (A).

Among additional constituents which can be incorporated in the composition (C3), generally in minor amounts, mention may be made, by way of examples, of fluorinated elastomers (such as the fluorinated rubber DAI-EL® G 801), acrylic elastomers (such as methyl methacrylate/butadiene copolymers) and ethylene/propylene, ethylene/1-butene, propylene/1-butene and butadiene/styrene copolymers. The total amount of the additional constituent or constituents advantageously does not exceed 5 percent by weight with respect to the total weight of the composition (C3).

Nevertheless, embodiments wherein the composition (C3) does not contain any additional polymer component different from components (C3-A) and (C3-B), as above detailed, are generally preferred.

According to certain embodiments, the multilayer assembly of the invention further comprises at least one layer (L4) made from at least one metal compound [metal (M)]; the expression metal (M) or metal compound is used according to its current meaning, i.e. to refer to metallic materials, including pure metals and alloys.

Multilayer assemblies according to this embodiment are particularly advantageous because of their outstanding barrier performances against moisture, so that they are particularly suitable as backsheets for thin films PV.

Among preferred variants of this embodiment, metal (M) is selected from steel, and aluminium, more preferably aluminium.

Assemblies of this type have generally a layout of type layer (L1)//optionally layer (L3)//layer (L4)//optionally layer (L3)//layer (L2), wherein each of layers (L1), (L2), (L3) and (L4) has the meaning as above detailed.

The incorporation of said layer (L4) provides for increased moisture barrier properties; nevertheless, the layer (L4) is generally encapsulated between layers (L1) and (L2) having insulating properties, so as to avoid electric dissipation or conduction because of the presence of the conductive metal (M) as above detailed.

Thickness of layer (L4) is not particularly limited. Thicknesses as low as hundreds Å to few nanometers might be satisfactory for ensuring appropriate moisture barrier properties. Layers (L4) of this thickness are generally achieved through sputtering or other metal coating techniques. As an alternative, metal foils can be used as layer (L4), with slightly higher thicknesses (up to few microns).

The invention also pertains to a method for manufacturing the multilayer assembly, as above detailed.

Use may be made of any usual techniques for assembling polymer layers to prepare the multilayer assemblies according to the invention.

An example of such techniques that may be mentioned includes those in which the compositions (C1), (C2) and optionally (C3) are used at a temperature at least equal to their softening point, typically at a temperature exceeding melting point of its polymer components. Preferably, the preparation of the multilayer assemblies according to the invention is performed by co-laminating, including hot lamination, co-extrusion, including co-extrusion-laminating, co-extrusion-blow moulding and co-extrusion-moulding, coating, including extrusion-coating, injection moulding including over-injection-moulding and co-injection-moulding.

The method for manufacturing the multilayer assemblies according to the invention is performed in a particularly preferred manner by co-laminating (more precisely hot lamination), coextrusion (in particular cast or hot blown, coextrusion-lamination) or overinjection-moulding.

The choice of one or other of these assembly techniques is made on the basis of the use for which the multilayer assemblies are intended, as well as the thicknesses of each layers.

For example, multilayer assemblies intended for being used as pipes, tubes, films, sheets and plaques are preferably manufactured by coextrusion.

Thus, the method for manufacturing the multilayer assembly of the invention is preferably performed by coextrusion of a layer (L1), of a layer (L2) and optionally, of a layer (L3) as above detailed.

The thickness of multilayer assemblies according to the invention is not critical and obviously depends on the use for which said assemblies are intended.

The invention also relates to the use of the multilayer assemblies according to the invention for the manufacture of tubes, pipes, cladding, films, sheets, profiles, plaques and hollow bodies.

Pipes comprising multilayer assemblies, as above detailed, are particularly useful in oil and gas and chemical processing industry, as well as in drinkable water transportation.

Further, in addition, a field of use which has been found particularly interesting for the multilayer assemblies of the present invention is the domain of protection of PV modules.

Thus, a method for protecting a PV module including covering said module with at least one multilayer assembly as above defined is still another aspect of the present invention.

According to this method, the multilayer assembly is used for back protection of the PV cell module, back side being the side opposite to that exposed to incident light. Multilayer assemblies, as above detailed, are particularly useful as back sheets in PV modules.

Should the disclosure of any patents, patent applications, and publications which are incorporated herein by reference conflict with the description of the present application to the extent that it may render a term unclear, the present description shall take precedence.

The invention will be now described in more detail with reference to the following examples, whose purpose is merely illustrative and not intended to limit the scope of the invention.

Raw Materials

Polymers

PVDF-1: SOLEF® PVDF 41308 is a copolymer commercially available from Solvay Solexis S.p.A. comprising recurring units derived from a (meth)acrylic monomer as above detailed.

PVDF-2: SOLEF® PVDF1008 is a homopolymer commercially available from Solvay Solexis S.p.A.

PET film from SKC, grade SKYROL® SG00L, 250 μm thickness.

Adhesive-1: IGETABOND® E ethylene-glycidyl methacrylate-methyl acrylate terpolymer is commercially available from Sumitomo Chemicals Inorganic UV Blocker Compound ZnO-1 is a UV-blocker made of particles of ZnO coated with a mixed $Al_2O_3$—$SiO_2$ oxide, commercially available under trade name SOLASORB® UV200F from CRODA, available under the form of liquid dispersion. The average particle size of the particles is about 40-60 nm. The solid content of the dispersion is about 50% wt.

ZnO-2 is an inorganic compound in powder form made of particles of ZnO having tradename OXMER® 141, whose particles have sizes in the range of from 5 to 10 μm.

ZnS-1 is a commercially available ZnS powder sold under trade name SACHTOLICH® HD-S, with average particles size in the micrometers range.

General Manufacturing Procedure of the Compositions of the Invention

The inorganic compound and the required amount of PVDF were blended in a rapid mixer at 300 rpm for 3 minutes. Powder mixture was then processed by extrusion in a double screw 30-34 extruder (LEISTRITZ), equipped with 6 temperature zones and a 4 mm-2 holes die.

Temperatures set points were set as follows:

TABLE 1

| Feed zone | T1 | T2 | T3 | T4 | T5 |
|---|---|---|---|---|---|
| 170° C. | 170° C. | 175° C. | 175° C. | 175° C. | 175° C. |

Screws speed was set at 50 rpm, with a feed rate of 20%, so as to yield a throughput rate of about 10 kg/h, and a melt pressure of about 60 bar. Extruded strands were cooled in a water bath, dried, calibrated and cut in a pelletizer.

Blend 1 (according to the invention) was composed of PVDF-1, ZnO-1 (4 wt % of liquid dispersion; real, on solids 2 wt %)

Blend 2C (of comparison) was composed of PVDF-1 and ZnS-1 (30 wt %)

Blend 3 (according to the invention) was composed of PVDF-1 and ZnO-2 (2 wt %).

Manufacture of Multilayer Assemblies by Coextrusion and Colamination

For manufacturing multilayer assemblies, pellets of blends as above detailed were processed in a coextrusion cast film line equipped with a 2.5" single stage extruder (A) and a with 2" satellite co-extruder (B). Extruders were connected to the die via a feedblock equipped with a selector plug able to give the following layers' sequence:

B(adhesive)/A(blend). The die was a 915 mm wide auto-gauge die. Upon exit from the die, molten tape was casted on three subsequent chill rolls, whose speed was adapted so as to obtain a film thickness of about 30 μm. Total thickness and thickness variation along the width are controlled by a Beta-ray gauge control system with retrofit to the die. The following processing conditions were used for a 30 μm thick film (5/25 μm as partial thickness sequence). A pre-extruded bioriented PET roll (SKYROL® SG00L 250 micron thick from SKC) was extrusion-laminated with the bi-layer coextruded material, according to the process layout sketched in FIG. 1.

In FIG. 1, 1. is the unwinding station wherein the PET film roll was loaded; the PET unwinded film 2. was fed in the nip between the top roll 5. and the centre roll 6. in combination with the molten co-extruded film, obtained from co-extrusion of polymer blend fed to extruder A. (10.) and adhesive fed to satellite extruder B (9.), so as to achieve hot lamination of the PET film onto the PVDF film through the adhesive tie-layer. Multilayer film was further made to pass through nip between centre roll 6. and bottom roll 7, and finally the so assembled and stabilized multilayer assembly 8. was sent to the winder.

Extruder A was fed with pellets of blends, prepared as above detailed (for layer L1), while satellite co-extruder B was fed with pellets of Adhesive-1 (for layer L3). Both extruders were equipped with screen pack filters. To obtain the desired thicknesses and ratio, extruders and line speeds were set as follow: Extruder A=>50 rpm; Extruder B=>20 rpm; Line speed=>9 m/min. Extruder A temperatures' profile used in the example are summarized in following table:

TABLE 2

| Zone | Temperature (° C.) |
|---|---|
| Main Barrel Zone 1 | 205 |
| Main Barrel Zone 2 | 210 |
| Main Barrel Zone 3 | 210 |
| Main Barrel Zone 4 | 210 |
| Main Barrel Zone 5 | 210 |
| Clamp | 215 |
| Adapter 1 | 210 |
| Adapter 2 | 210 |

Extruder B temperatures' profile used in the examples are summarized in following table:

TABLE 3

| Zone | Temperature (° C.) |
|---|---|
| Main Barrel Zone 1 | 205 |
| Main Barrel Zone 2 | 210 |
| Main Barrel Zone 3 | 210 |
| Main Barrel Zone 4 | 210 |
| Clamp | 205 |
| Adapter 1 | 210 |
| Adapter 2 | 210 |

Feed-block, die and calendering rolls temperatures are further detailed in following table:

TABLE 4

| Zone | Temperature (° C.) |
|---|---|
| Feedblock | 215 |
| Die Zone 1 | 230 |
| Die Zone 2 | 230 |
| Die Zone 3 | 230 |
| Die Zone 4 | 230 |
| Die Zone 5 | 230 |
| Top Roll | 38 |
| Center Roll | 110 |
| Bottom Roll | 115 |

Final width of the so-obtained multilayer assembly (L1) (=Blend 1)/(L3) (=Adhesive-1)/(L2) (=PET), after edge cutting, was about 710 mm.

Adhesion Test of Different Compositions of both PVDF and UV Blockers

Adhesion test were conducted by assembling by compression moulding specimens of films of different separated components on a 20 tonnes motorized Moore press equipped with electrical heating and water cooling plates. Each individual layer (PVDF-1, PVDF-2, Adhesive-1, Blend 1 and Blend 2C) were first prepared under the following conditions:

TABLE 5

| Time (min) | T (° C.) | Load (Kg) |
|---|---|---|
| Preheating | | |
| 5 | 230 | — |
| Moulding | | |
| 2 | 230 | 16 000 |
| Cooling | | |
| Cooling method | Cooling rate | Load (kg) |
| Cold water press | fast | 16 000 |

After having prepared all materials, following conditions were used in the same press for obtaining the assemblies detailed below (see peel strength results):

TABLE 5

| Time (min) | T (° C.) | Load (Kg) |
|---|---|---|
| Preheating | | |
| 5 | 230 | — |
| Moulding | | |
| Time (min) | T (° C.) | Pressure (bar) |
| 4 | 230 | 75 |
| Cooling | | |
| Cooling method | Cooling rate | Pressure (bar) |
| Cold water press | fast | 75 |

The resulting multilayer assemblies were then submitted to peel strength evaluation according to ASTM D903.
Results are summarized in the following table:

TABLE 7

| Sample | Peeling strength [N/cm] |
|---|---|
| PVDF-1/Adhesive-1 | 82.00 |
| Blend 1/Adhesive-1 | 72.00 |
| Blend 2C/Adhesive-1 | 40.00 |
| PVDF-2/Adhesive-1 | 11.00 |

Results provided in Table herein above well demonstrate that the addition of limited amount of an inorganic component (Blend-1) has no significant detrimental effect on adhesive properties which a (meth)acrylic-modified VDF polymer inherently has (see PVDF-1). These adhesion properties are largely better than those which a bare VDF homopolymer is endowed with (see PVDF-2). Also, the addition of a significantly larger amount of an inorganic filler (see Blend 2C) to a (meth)acrylic-modified VDF polymer strongly detrimentally affect the effect of hydrophilic (meth)acrylic monomer in the VDF polymer matrix, so that peeling strength is significantly depressed.

Monolayer Films Preparation for UV-Vis Spectrum Collection

For manufacturing thin films, pellets were processed in a small single screw extruder Braebender (screw speed=25 rpm) equipped with 5 temperature zones, set as below detailed, and a 0.5 mm×100 mm tape die. Upon exit from the die, molten tape was rolled onto two subsequent chill rolls kept at a temperature of 115° C., whose speed was adapted so as to obtain a film thickness of about 25 µm. The PVDF-2, Blend 1 and Blend 3 were processed in a similar manner.

TABLE 8

| Feed zone | T1 | T2 | T3 | T4 |
|---|---|---|---|---|
| 210° C. | 210° C. | 210° C. | 210° C. | 210° C. |

Figure 2:
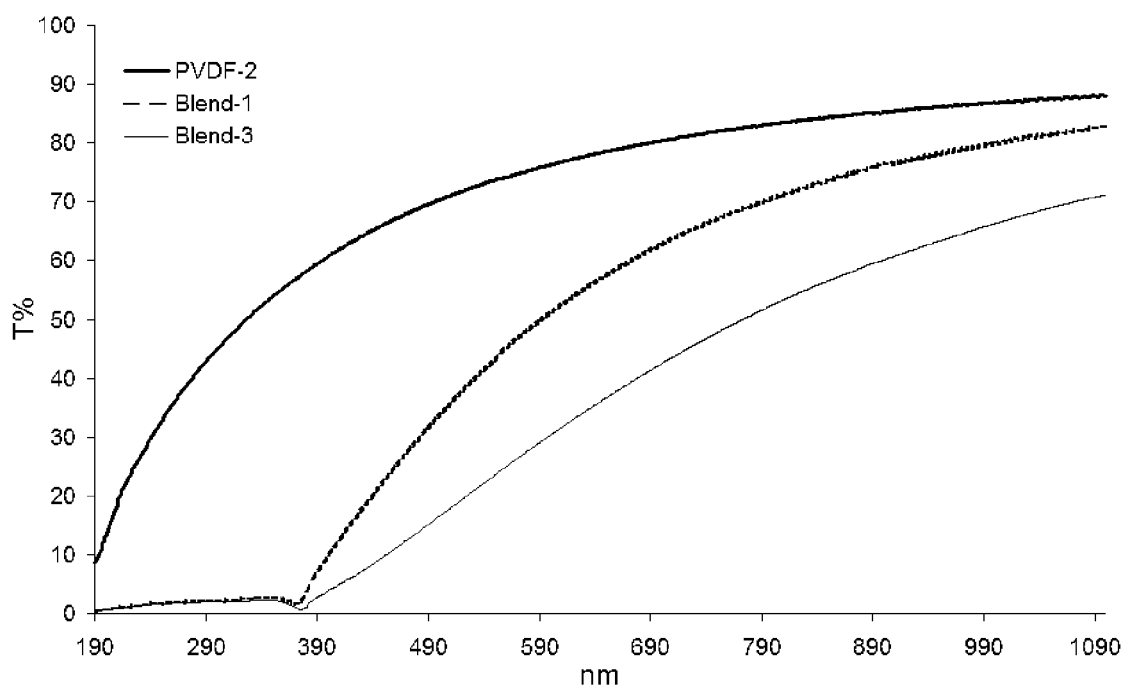
FIG. 2 is a graph of total transmittance (in %) as a function of wavelength (in nm) from 190 nm to 1100 nm through the UV and VIS regions.

Films obtained were tested for their UV blocking properties, by determining total transmittance as a function of the wavelength. Graph of total transmittance (in %) as a function of wavelength (in nm) from 190 nm to 1100 nm through the UV and VIS regions are provided in FIG. 2, for films made from composition Blend 1, PVDF-2 and Blend 3, showing substantial opacity against UV rays only for film of composition Blend 1 and 3, while unfilled film of bare PVDF-2 was not effective in blocking radiation in the UV range and thus not able to protect from weathering the underneath insulating layer.

The invention claimed is:
1. A multilayer assembly comprising:
a first layer (L1) made from a composition (C1), wherein the composition (C1) comprises:
at least one acrylic modified VDF polymer (A) comprising at least 90% moles of recurring units derived from at least one vinylidene fluoride (VDF) monomer and at least 0.05% moles and at most 10% moles of recurring units derived from at least one hydrophilic acrylic monomer (MA) selected from the group consisting of:
hydroxyethylacrylate (HEA) of formula:

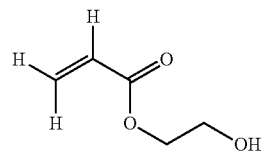

2-hydroxypropyl acrylate (HPA) of either of formulae:

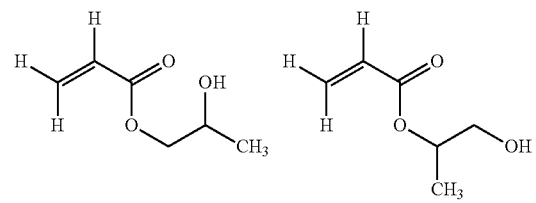

acrylic acid (AA) of formula:

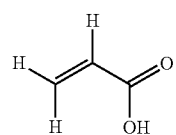

and mixtures thereof, and
at least one inorganic UV blocker compound comprising ZnO, wherein the inorganic UV blocker compound is present in an amount not exceeding 5% wt, with respect to the weight of polymer (A), and wherein the average particle size of said inorganic UV blocker compound is less than 150 nm; and
a second layer (L2) made from a second composition (C2), wherein composition (C2) comprises at least one polyester (P) selected from the group consisting of:
polyglycolide, polyglycolic acid (PGA) and copolymers thereof, optionally in admixture with other polycondensable comonomer(s);
polylactic acid (PLA) and copolymers thereof, optionally in admixture with other polycondensable comonomer(s);
polycaprolactone (PCL) and copolymers thereof, optionally in admixture with other polycondensable comonomer(s);
polyethyleneadipate (PEA) and other copolymers;
polyhydroxyalkanoate (PHA), which are the result of polycondensation of hydroxy fatty acids with chain lengths from 3 to 15 carbon atoms;
polyethylene terephthalate (PET) and copolymers thereof, optionally in admixture with other polycondensable comonomer(s);
polybutylene terephthalate (PBT) and copolymers thereof, optionally in admixture with other polycondensable comonomer(s);
polytrimethylene terephthalate (PTT) and copolymers thereof, optionally in admixture with other polycondensable comonomer(s); and
polyethylene naphthalate (PEN) and copolymers thereof, optionally in admixture with other polycondensable comonomer(s).

2. The multilayer assembly of claim 1, wherein the acrylic modified VDF polymer (A) comprises recurring units derived from the at least one vinylidene fluoride (VDF) monomer, from at least one additional monomer selected from the group consisting of trifluoroethylene, trifluorochloroethylene, hexafluoropropylene, and fluoroalkyl vinyl ether, and from the at least one hydrophilic acrylic monomer (MA), wherein the amount of vinylidene fluoride (VDF) monomer is at least 90% mol, with respect to the total of the vinylidene fluoride (VDF) monomer and the additional monomer.

3. The multilayer assembly of claim 1, wherein the average particle size of said inorganic UV blocker compound is less than 120 nm.

4. The multilayer assembly of claim 1, wherein said inorganic UV blocker compound comprises ZnO in combination with at least one other inorganic oxide compound.

5. The multilayer assembly of claim 1, said composition comprising said inorganic UV blocker compound in an amount not exceeding 4% wt, with respect to the weight of polymer (A).

6. The multilayer assembly of claim 1, wherein composition (C2) further comprises at least one polyolefin (O) selected from the group consisting of polymers comprising recurring units derived from ethylene, propylene and mixtures thereof.

7. A tube, pipe, cladding, film, sheet, profile, plaque or hollow body comprising the multilayer assembly according to claim 1.

8. The multilayer assembly of claim 1, wherein polymer (A) comprises at least 0.2% moles, and at most 3% moles of recurring units derived from said hydrophilic acrylic monomer (MA).

9. The multilayer assembly of claim 1, wherein the average particle size of said inorganic UV blocker compound is less than 80 nm.

10. A multilayer assembly comprising:
a first layer (L1) made from a composition (C1), wherein the composition (C1) comprises:
at least one acrylic modified VDF polymer (A) comprising at least 90% moles of recurring units derived from at least one vinylidene fluoride (VDF) monomer and at least 0.05% moles and at most 10% moles of recurring units derived from at least one hydrophilic acrylic monomer (MA) selected from the group consisting of:
hydroxyethylacrylate (HEA) of formula:

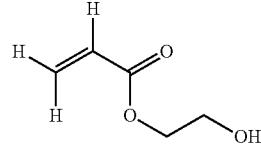

2-hydroxypropyl acrylate (HPA) of either of formulae:

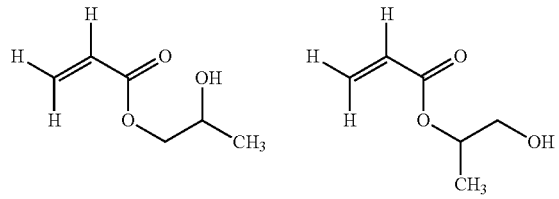

acrylic acid (AA) of formula:

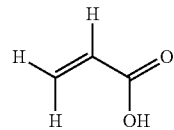

and mixtures thereof, and
at least one inorganic UV blocker compound comprising ZnO, wherein the inorganic UV blocker compound is present in an amount not exceeding 5% wt, with respect to the weight of polymer (A), and wherein the average particle size of said inorganic UV blocker compound is less than 150 nm; and
a second layer (L2) made from a second composition (C2),
said assembly additionally comprising a third layer (L3), said layer (L3) adhering to layer (L1) on one side and to layer (L2) on the opposite side, wherein layer (L3) is made from a composition (C3) comprising at least one of:
(C3-A) alpha-olefin polymers modified by grafting of at least one monomer comprising a functional group selected from the group consisting of a carboxyl acid in its acid, ester, salt, amide, anhydride form, a hydroxyl, and an epoxide; and
(C3-B) linear copolymers comprising recurring units derived from monoethylenic monomers which carry an alkyl carboxylate functional group.

11. The multilayer assembly of claim 10, said assembly additionally comprising at least one layer (L4) made from at least one metal compound (M).

12. A method for manufacturing the multilayer assembly of claim 1, said method comprising coextruding a layer (L1), a layer (L2) and optionally, a layer (L3).

13. A method for protecting a PV module comprising covering said module with at least one multilayer assembly according to claim 1.

* * * * *